United States Patent [19]
Engstrom

[11] 3,786,284
[45] Jan. 15, 1974

[54] SOLID STATE SWITCH CONTROL CIRCUIT

[75] Inventor: Keith A. Engstrom, River Grove, Ill.

[73] Assignee: Illinois Tool Works, Inc., Chicago, Ill.

[22] Filed: Feb. 8, 1973

[21] Appl. No.: 330,704

[52] U.S. Cl. .................. 307/314, 307/247, 307/235
[51] Int. Cl. .......................................... H03k 17/00
[58] Field of Search .................... 307/314, 235, 247

[56] References Cited

UNITED STATES PATENTS

| | | | |
|---|---|---|---|
| 3,588,549 | 6/1971 | Buch | 307/314 |
| 3,289,040 | 11/1966 | Pfau et al. | 307/314 X |

*Primary Examiner*—John W. Huckert
*Assistant Examiner*—B. P. Davis
*Attorney*—Roy H. Olson et al.

[57] ABSTRACT

The embodiment of the invention disclosed herein is directed to a solid state switch control circuit which includes a pulsating voltage source and a switching circuit. A saturable closed loop magnetic core structure is associated with drive and sense wires which are connected between the pulsating voltage source and the switching circuit. Actuating signals are coupled to the switching circuit when the closed magnetic core structure is sufficiently magnetically unsaturated to provide transformer coupling between the drive and sense wires. A time delay signal is provided at the clock input terminal of the switching circuit to cooperate with the input signals for actuating the switching circuit only during synchronized pulses at the input. A feedback resistor is provided between the output of the switching circuit and the input thereof to lock the switching circuit in its switched condition until the input signals thereof drop below a minimum voltage which is substantially less than the actuating voltage to provide an electronic hysteresis.

7 Claims, 3 Drawing Figures

SOLID STATE SWITCH CONTROL CIRCUIT

BACKGROUND OF THE INVENTION

This invention relates generally to solid state switches, and more particularly to solid state switch control circuits using toroidal magnetic cores and associated drive and sense wires.

The recent development of solid state switch devices, of the type having closed magnetic core structures and movable magnets associated therewith, has substantially improved the reliability of switching functions such as those obtained in keyboards and the like. The solid state switches include drive and sense wires passing through the magnetic core structures and together therewith, function as a plurality transformer device when the magnetic cores are in an unsaturated condition. However, when the magnetic cores are saturated no transformer coupling occurs between the drive and sense wires. The magnetic cores can be magnetically saturated by any suitable means such as small permanent magnets which are movable toward and away from their respective cores. By displacing the magnets, the magnetic cores become unsaturated to allow transformer coupling to take place between the drive and sense wires.

One of the problems of this type of solid state switch, i.e. a switch structure having a magnetic core, drive and sense wires, and a movable magnet, is that it is an analogue device. In other words, as the magnet moves toward and away from the toroidal magnetic core, the output signal obtained from the sense line will vary in amplitude as a result of increasing transformer coupling. If the device being controlled by the solid state switch is a switch circuit such as a one-shot, it may be triggered to the switched state as a result of extraneous noise signals which may occur during the slightest actuation of the switch. Because of noise, a signal may be driven above and below the trigger level of the one-shot input and inadvertently cause it to change state.

SUMMARY OF THE INVENTION

It is an object of this invention to provide an improved solid state switch control circuit which can utilize the solid state switches of the type described herein without the adverse effects of noise effecting extraneous actuation of an external switching circuit connected thereto.

Another object of this invention is to provide an improved solid state switch control circuit which provides sufficient electronic hysteresis to eliminate extraneous actuation of the external switching circuit connected thereto.

Another object of this invention is to provide an improved solid state switch control circuit which is simple and inexpensive to manufacture while maintaining a high degree of efficiency and reliability in use.

A feature of this invention is the use of a circuit having a time delay signal path paralleling the switching signal path through the closed magnetic core structure. A resistance feedback is provided at the output of a flip-flop circuit and coupled back to the input thereof to require a different voltage level to reset the flip-flop. This insures that the voltage supplied to the set input of the flip-flop must drop well below the actuating voltage before a reset threshold voltage can be reached, and hence it provides an electrical hysteresis characteristic for the circuit.

The closed loop magnetic core structure may be cylindrical, rectangular, or toroidal in shape, although the toroidal shape is presently preferred.

Many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
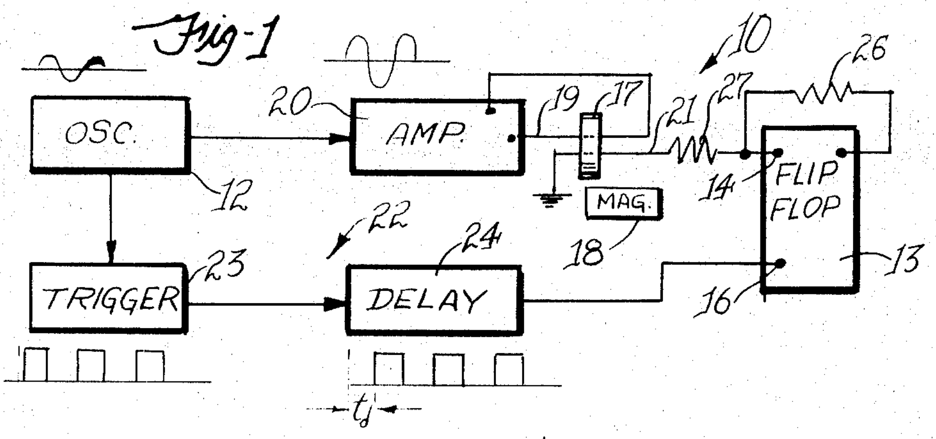
FIG. 1 is a schematic block diagram of one form of solid state switch control circuit which is constructed in accordance with the principles of this invention.

Referring now to FIG. 1 there is seen a solid state switch control circuit constructed in accordance with the principles of this invention and designated generally by reference numeral 10. The solid state switch control circuit 10 includes an oscillating voltage source 12 which is here illustrated as an oscillator circuit providing a sine wave output. The circuit also includes a switching circuit 13, preferable a flip-flop device, having a switching input terminal 14 and a clock input terminal 16. The output of the flip-flop device 13 will change its state when a sufficient signal is applied to the switching input 14 and the edge of the clock signal is at a predetermined voltage level. The clock input terminal will enable the flip-flop circuit when the applied voltage at the switching intput terminal is positive. The flip-flop will then be triggered to change its state when the voltage at the input terminal is above a predetermined on minimum value. The flip-flop returns automatically to its off state when the clock input is triggered and no voltage of predetermined off minimum magnitude is applied to the switching input terminal 14.

A close loop magnetic core structure 17 is arranged to control the amplitude of signals applied to the switching input terminal 14. The core structure here illustrated is toroidal in configuration it being understood that other shapes may be used. The toroidal magnetic core is capable of being magnetically saturated and unsaturated as a result of movement on a permanent magnet 18 placed in close proximity thereto. The magnet 18, when positioned adjacent the core 17, will saturate the core so that no signal can be coupled through the core. When the magnet 18 is displaced from the toroidal magnetic core 17, signal coupling will occur and an input signal will be applied to the input terminal 14. A drive wire 19 passes through the toroidal magnetic core and is connected to an amplifier circuit 20 which amplifies the signal from the oscillator 12 to a sufficient level for providing a driving current. A sense wire 21 also passes through the toroidal magnetic core and is connected to the input terminal 14 of the flip-flop 13.

The cooperation between the drive and sense wires is substantially that of a transformer device, i.e., transformer coupling occurring when the toroidal magnetic core 17 is in an unsaturated condition. The amplitude of the signal that is transformer coupled to the same wire 21 is dependent upon the distance the magnet 18 is relative to the toroidal magnetic core 17.

Time delay means 22 is connected between the oscillating voltage source 12 and the switching circuit 13 to substantially parallel the signal path, passing through the toroidal magnetic core 17. The time delay means 22 preferably comprises a trigger circuit 23 and a series connected time delay circuit 24. The trigger circuit 23 may be a Schmitt trigger device, or may be any other suitable trigger device having a minimum threshold input level.

In operation, the oscillator drives the amplifier to such an extent to provide a sufficient output voltage across the primary winding formed by the drive line 19. This voltage is induced into the secondary winding formed by the sense line 21 when the toroidal magnetic core 17 is in an unsaturated condition. When the core is saturated the voltage decreases to zero and no output signal will be obtained.

The output of the oscillator circuit 12 also feeds the trigger circuit which produces a square wave output signal in phase with the sine wave. This is delivered to the delay circuit 24 to delay the positive pulses sufficient so that the positive edge occurs when voltage at the input of the flip-flop 14 is at its maximum. It will be understood that the delay function also can be accomplished by changing the trigger level of the trigger circuit 23.

The induced positive voltage in the secondary winding formed by the sense line 21 is sampled at the input terminal 14 of the flip-flop on positive edge of the clock. If the positive voltage is of sufficient magnitude the flip-flop will change to a logic one state and provide a feedback signal through a resistor 26. This feedback signal provides a bounceless output and an electrical hysteresis characteristic for the circuit. In the illustrated embodiment the signal delivered across the sense line 21 passes through a series resistor 27.

Figure 2:
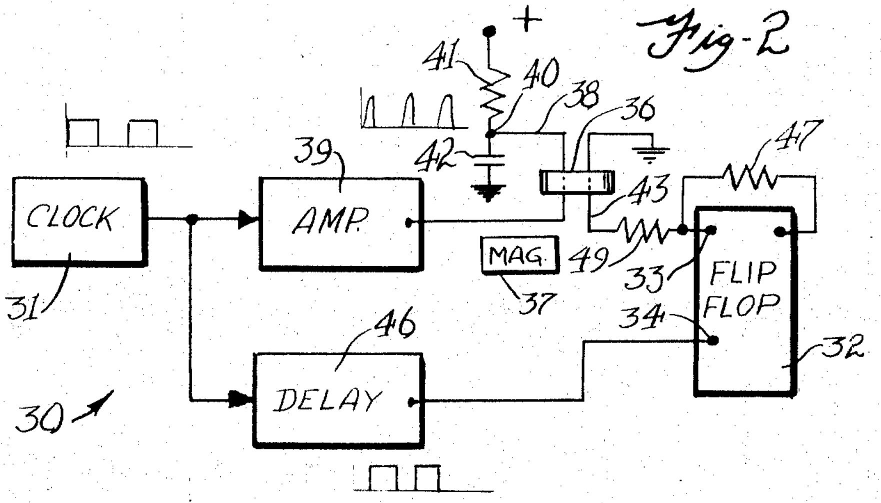
FIG. 2 is an alternate arrangement of the solid state switch control of this invention.

Referring now to FIG. 2 there is seen an alternate form of the solid state switch control circuit constructed in accordance with the principles of this invention and is designated generally by reference numeral 30. Here a pulsating voltage source 31 is formed by a clock generator and is used to control the operation of a switching circuit 32. The switching circuit 32 is again shown as a flip-flop circuit similar to that disclosed with regard to FIG. 1. By utilizing the clock generator 31 the oscillator and Schmitt trigger configuration of FIG. 1 can be eliminated. The switching circuit 32 includes an input terminal 33 and a clock input terminal 34 which functions substantially in the same manner as disclosed above.

A toroidal magnetic core 36 is capable of being magnetically saturated and unsaturated as a result of movement of an associated permanent magnet 37. A drive wire 38 passes through the toroidal magnetic core and has one end thereof coupled to an amplifier 39 and the other end thereof connected to a terminal point 40 located between a resistor 41 and a capacitor 42. A sense wire 43 also passes through the toroidal magnetic core and functions as the secondary winding of a transformer when the core is in the magnetically unsaturated condition. A delay line circuit path is provided by a delay circuit 46 which parallels the signal path provided through the toroidal magnetic core.

The flip-flop circuit 32 is provided with a feedback resistor 47 which functions in the same manner as the resistor 26 of FIG. 1. The amplifier 39 and time delay circuit 46 operate in synchronization with one another to provide input signals to the switching input terminal 33 and the clock input terminal 34. When the signal level at terminal 33 is of sufficient amplitude the flip-flop will switch to its high state and when the signal level drops below a given level the flip-flop will automatically switch back to its low state.

Figure 3:
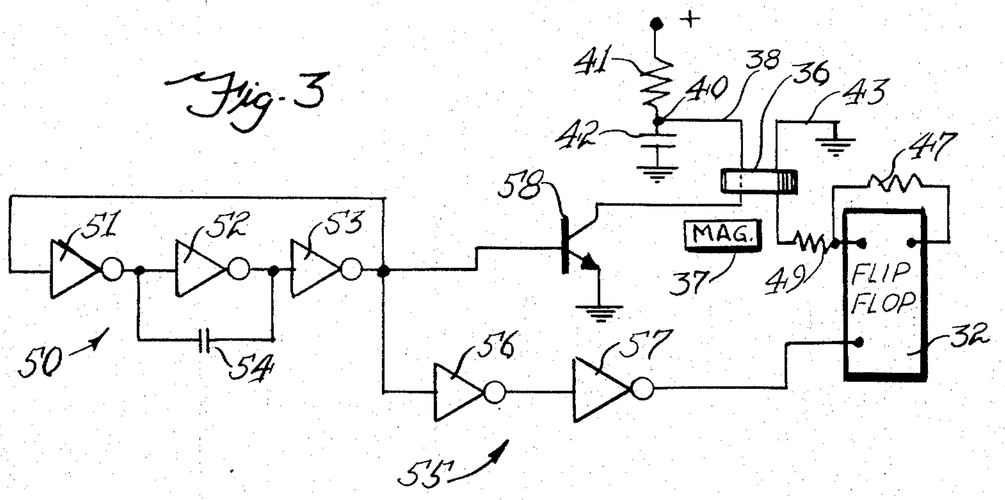
FIG. 3 is a more detailed schematic diagram of the circuit arrangement of FIG. 2.

For a better understanding of the circuit of FIG. 2 reference is now made to FIG. 3 which is a more detailed showing of the circuit configuration. Here the clock circuit is illustrated by reference numeral 50 and comprises three invertor circuits 51, 52, and 53 connected in series with a capacitor 54 connected across the invertor 52. The time delay circuit is designated generally by reference numeral 55 and comprises a pair of series connected invertor circuits 56 and 57. The amplifier comprises a single transistor 58 and a resistor 59 having the emitter thereof connected to ground potential and collector thereof connected to the circuit point 40. The drive wire 38 is connected to the circuit point 40 and provides a current coupling output pulse when transistor 58 is rendered conductive to discharge capacitor 42.

While several specific embodiments are illustrated herein it will be understood that still other circuit configurations can be utilized without departing from the spirit and scope of the novel concepts disclosed and claimed herein.

The invention is claimed as follows:

1. A solid state switch control circuit, comprising in combination: an oscillating voltage source, a switching circuit having a switching input terminal, said switching circuit capable of being activated to a switched state when an input signal at said switching input terminal is above a predetermined voltage level, a closed magnetic core structure capable of being magnetically saturated and unsaturated in response to the application of a magnetic field, magnet means positioned adjacent said closed magnetic core structure for saturating and unsaturating said core, a drive wire connected to said oscillating voltage source and passing it through said closed magnetic core, structure a sense wire connected to said switching circuit and passing it through said closed magnetic core structure, said drive and sense wire providing a transformer coupling therebetween when said closed magnetic core structure is in an unsaturated state, and time delay means connected between said oscillating voltage source and said switching circuit and providing a parallel signal path to the signal path through said drive and sense wires, whereby actuation of said switching circuit will occur only when said closed magnetic core structure is sufficiently unsaturated and when a pulse is applied to said switching circuit through said time delay means.

2. The solid state switch control circuit according to claim 1, wherein said oscillating voltage source is an oscillator providing a sine wave, and said time delay means includes a trigger circuit connected in series with a delay circuit for providing a suitable time delay at a clock input of said switching circuit.

3. The solid state switch control circuit according to claim 2, further including amplifier means connected in series with said drive wire for applying thereto an amplified pulsating signal.

4. The solid state switch control circuit according to claim 1, wherein said pulsating voltage source includes a clock pulse generator providing square wave signals at the output thereof which are applied to said drive wire and to the input of said time delay means.

5. The solid state switch control circuit according to claim 4, including capacitor means connected to said drive wire, and wherein signal coupling between said drive wire and said sense wire occurs upon discharge of said capacitor means.

6. The solid state switch control circuit according to claim 1, wherein said switch circuit is a flip-flop circuit, said flip-flop circuit including a feedback resistor connected between the output thereof and said switching input terminal for providing a locking voltage at the input of said flip-flop, whereby the voltage applied thereto must drop substantially below the voltage provided for initial actuation thereof before said flip-flop will be reset.

7. The solid state switch control circuit according to claim 1, wherein said closed magnetic core structure is toroidal in configuration.

* * * * *